Patented Jan. 12, 1932

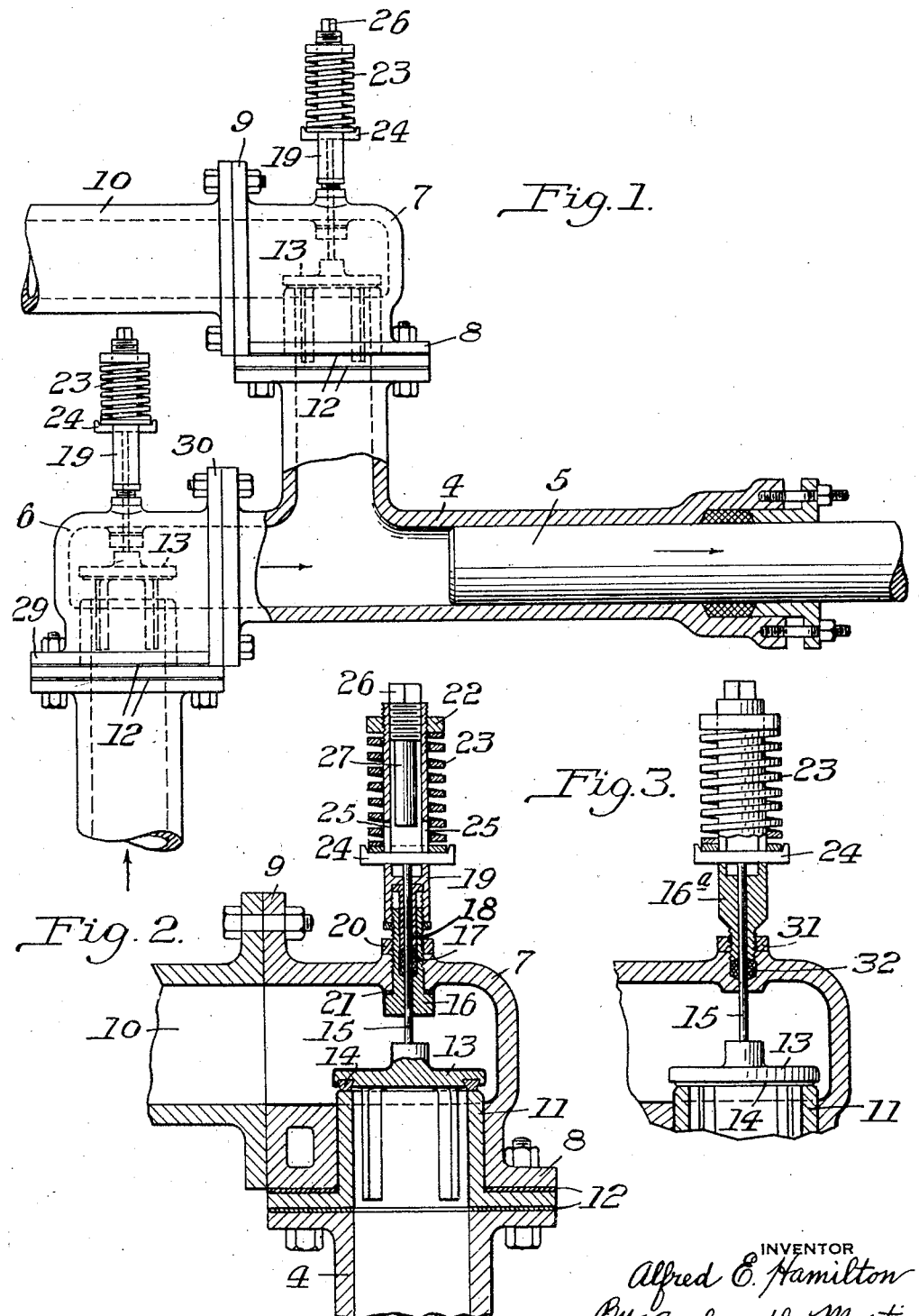

1,841,029

UNITED STATES PATENT OFFICE

ALFRED E. HAMILTON, OF PITTSBURGH, PENNSYLVANIA

VALVE

Application filed July 13, 1928. Serial No. 292,448.

My invention relates to valves, and more particularly to the suction and discharge valves of pumps, but various features of the invention are capable of use in structures of other types.

My valve structure is of such character that it is especially suitable for use where water or other liquid that is brought into contact therewith contains acids or other substances which are deleterious to iron, steel, etc., as in the case of water from coal mines, certain wells, sea water, etc.

One object of my invention is to provide a valve structure of such character that those portions thereof with which the liquid contacts are acid-resisting and non-corrosive.

Another object of my invention is to provide a check valve structure wherein the tension spring is disposed exteriorly of the valve chamber and out of the path of flow of liquid which passes through the valve.

Another object of my invention is to provide an improved form of stuffing box and guide for a valve stem.

Still another object of my invention is to provide an improved means for regulating the length of stroke of a valve stem.

Another object of my invention is to provide an improved form of valve seat.

A further object of my invention is to provide a valve structure that may be alternatively used either as the suction valve or the discharge valve of a pump installation.

A still further object of my invention is to simplify and improve generally the structure and working arrangement of valves.

Some of the forms which my invention may take are shown in the accompanying drawings wherein Figure 1 is a view, partially in elevation and partially in section, of a pump structure in which valves embodying my invention are applied; Fig. 2 is a sectional view, on an enlarged scale, of a portion of the structure of Fig. 1; and Fig. 3 is a view showing a modification of the valve device of Fig. 2.

For convenience of description, I have shown my invention as employed in connection with a pump of the plunger type wherein 4 represents a pump chamber and 5 a reciprocable plunger or piston which is reciprocated in any suitable manner to alternately draw liquid through a suction valve chamber 6 and discharge it through a valve chamber 7.

The valves of the valve chambers 6 and 7 are of identical form and therefore a description of the valve in chamber 7 will suffice also to explain the structure of the other valve.

The valve chamber 7 is provided with flanges 8 and 9 by means of which it may be bolted to the pipe flange of the pump chamber 4 and to a charge conduit 10 respectively. A valve seat 11 is bolted between the flanges of the valve chamber 7 and the pump chamber 4, suitable gaskets 12 being provided to prevent leakage. This valve seat can be readily installed and replaced, by simply disconnecting the valve chamber 7 from the pump chamber 4.

A valve disc 13 cooperates with the upper edge of the valve seat 11 to form a fluid-tight joint and prevent backflow to the pump chamber 4. The underside of the valve disc 13 has a groove of dovetail form for the reception of a gasket or cylinder ring 14 which may be of soft non-corrodible material such as lead and tin, or an alloy of such metals.

The ring 14 being of soft metal can be readily hammered into place in the dovetailed groove, so that it will not become displaced and, by reason of its composition, is not so subject to attack by acids, etc., as are the rings of other materials. Also, it is soft enough to make an effective seal with the valve seat.

The valve 13 is provided with a stem 15 that extends through a guide sleeve 16. The valve 13, the stem 15, the guide valve 16, the valve seat 11, and the inner surfaces of the valve chamber 7 are made acid-resisting by coating them with suitable enamel. This coating may be effected in various ways well-known in the art of making enameled ware, whereby one or more coatings of enamel are deposited upon metal surfaces. The stem 15 could also be made of stainless steel, which is acid-resisting.

The upper end of the guide sleeve 16 is recessed in order to serve as one member of a stuffing box structure. Packing material 17 is inserted into this recess and is compressed about the valve stem 15 by means of a sleeve-like collar 18 which is forced down against the packing by means of a sleeve 19 that has screw-threaded engagement with the upper portion of the guide sleeve 16, the guide sleeve 16 being rigidly secured in position upon the valve chamber 7 by a clamping nut 20 which draws the sleeve upward into snug engagement with a gasket 21.

The upper portion of the sleeve 19 is threaded both interiorly and exteriorly. A nut 22 co-operates with the exterior thread to serve as an adjustable seat for a compression spring 23 whose lower end seats upon a pin 24 which extends through slots 25 in the wall of the sleeve 19, the pin 24 seating upon or being connected to the upper end of the valve stem 15, so that the force of the spring 23, acting through the pin 24, will yieldably hold the valve 13 against its seat, thus permitting discharge flow through the valve chamber 7 upon compression stroke of the plunger 5, but preventing backflow through such chamber during the suction stroke of the plunger. The nut 22 can, of course, be adjusted to place the spring 23 under a desired degree of compression.

A nut 26 has threaded engagement with the interior of the sleeve 19 and has a stem 27 which extends into the zone of the slots 25 and into position to be engaged by the pin 24 when the valve 13 moves upwardly. The degree of opening movement of the valve 13 can be controlled through vertical adjustment of the nut 26.

It will be seen that the valve chambers 6 and 7 are interchangeable. For instance, the valve chamber 6, together with the valve structure carried thereby, can be made to serve as a discharge valve, if it be mounted above the pump chamber 4 in the position occupied by the valve chamber 7. The flanges 29 and 30 of the valve chamber 6 would, in that case, occupy the positions of the flanges 8 and 9, respectively of the valve chamber 7.

Notwithstanding the fact that the interiorly-exposed surfaces of the valve structure are enameled, a tight fit is nevertheless possible between various parts of the valve structure. For instance, the gasket 21 will prevent leakage of fluid between the horizontally-disposed contacting surfaces of the guide sleeve 16 and the adjacent portion of the valve body; the soft metal gasket 14 will permit of a tight seal with the enameled surface of the valve seat 11, while the enameled horizontal flange of the valve seat 11 is engaged by the gaskets 12.

Not only does the location of the springs exteriorly of the valve chamber remove them from contact with the liquid flowing through the valve, but they are readily accessible for adjustment, repairs, etc.

Referring to Fig. 3, I show a structure that is similar to the structure of Fig. 2, but wherein a guide sleeve 16a is provided that, instead of extending clear into the valve body as does the sleeve 16, has threaded engagement with a boss disposed exteriorly of the valve body, a lock nut 31 being provided for holding it in place. The stem 16a serves also to compress the packing 32 about the valve stem. The adjustments of the spring and of the length of throw of the valve stem 15 in this figure are effected in the same manner as in the case of the structure of Fig. 2.

I claim as my invention:—

1. Valve structure comprising a valve chamber, a guide sleeve extending through one wall of the chamber, a valve seat in said chamber, a valve co-operating with said seat, and having a stem extending through the said guide sleeve, a supporting sleeve mounted on the guide sleeve, a coil spring surrounding the supporting sleeve, a spring seat having slidable connection with the supporting sleeve and positioned to engage the outer end of the valve stem, the said seat abutting against the inner side of the spring, and an adjusting nut having screw-threaded engagement with the sleeve and bearing against the outer end of the spring.

2. Valve structure comprising a valve chamber, a guide sleeve extending through one wall of the chamber, a valve seat in said chamber, a valve co-operating with said seat and having a stem extending through the said guide sleeve, a supporting sleeve mounted on the guide sleeve, a coil spring surrounding the supporting sleeve, a spring seat having slidable connection with the supporting sleeve and positioned to engage the outer end of the valve stem, the said seat abutting against the inner side of the spring, an adjusting nut having screw-threaded engagement with the sleeve and bearing against the outer end of the spring, and a stop member having screw-threaded engagement with the supporting sleeve and positioned to limit the outward movement of the valve stem.

3. Valve structure comprising a valve chamber, a valve seat in said chamber, a valve cooperating with said seat and having a stem extending through one wall of the chamber, a sleeve member for slidably supporting the said stem, an adjustable stop member carried by said sleeve in position to be engaged by the end of the stem, a spring disposed circumferentially of said sleeve and having engagement with said stem to yieldably hold the valve in one position, and means movable independently of the stop member for adjusting the tension of the spring.

4. Valve structure comprising a valve chamber, a valve seat in said chamber, a valve cooperating with said seat and having a stem extending through one wall of the chamber, a guide sleeve disposed exteriorly of the chamber for slidably supporting the valve stem, the said sleeve having a tubular portion extending beyond the end of the stem, an adjustable stop member disposed in said tubular portion for regulating the length of stroke of the said stem, a spring disposed circumferentially of said portion, and having engagement with said stem to yieldably hold the valve in one position, and means movable independently of the stop member for adjusting the tension of the spring.

In testimony whereof I, the said ALFRED E. HAMILTON, have hereunto set my hand.

ALFRED E. HAMILTON.